Aug. 10, 1965  G. E. THOMPSON  3,199,640
AUTOMATIC ADJUSTER
Filed July 2, 1963  5 Sheets-Sheet 1
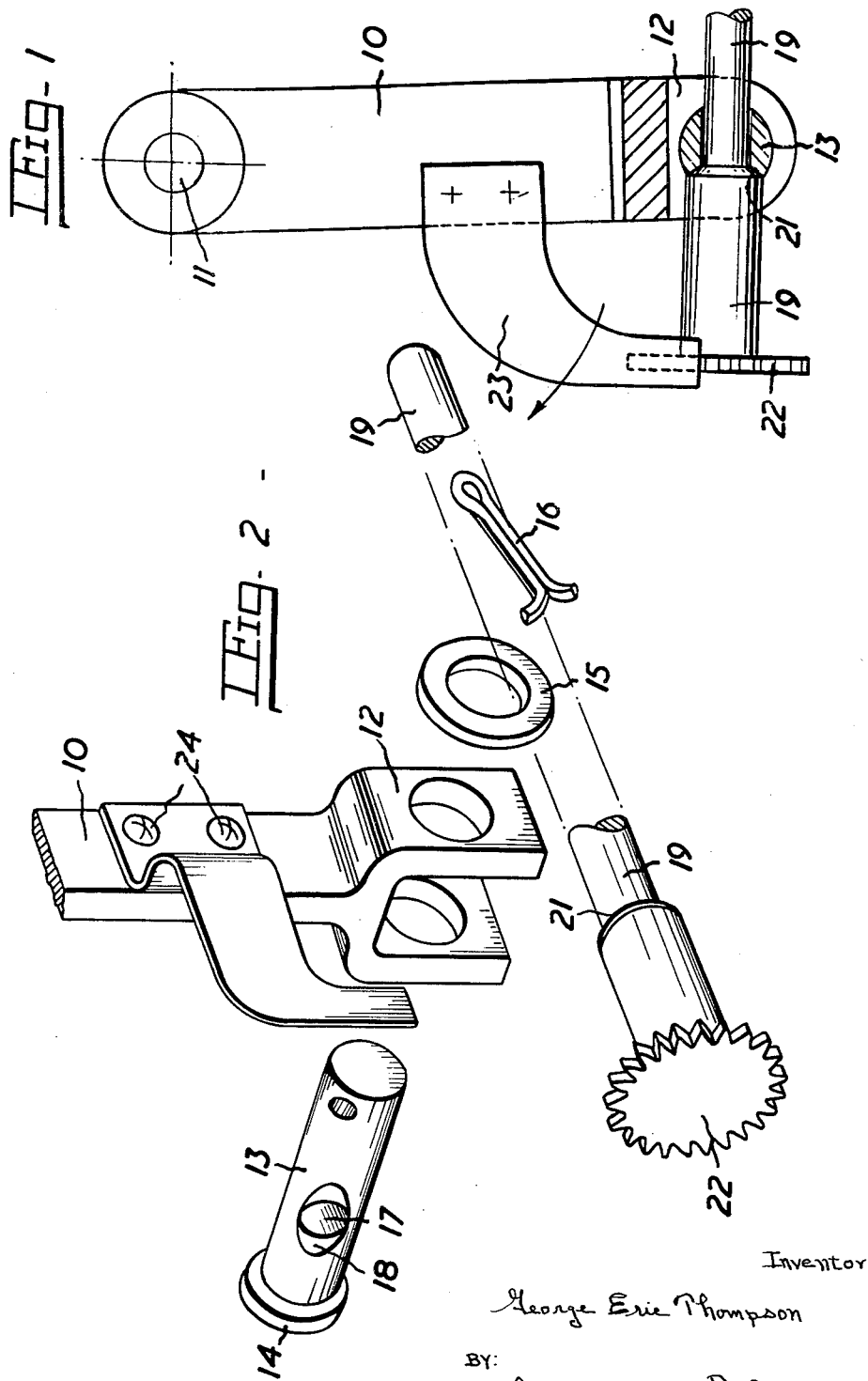
Inventor
George Erie Thompson
BY: Scrivener and Parker
Attorneys

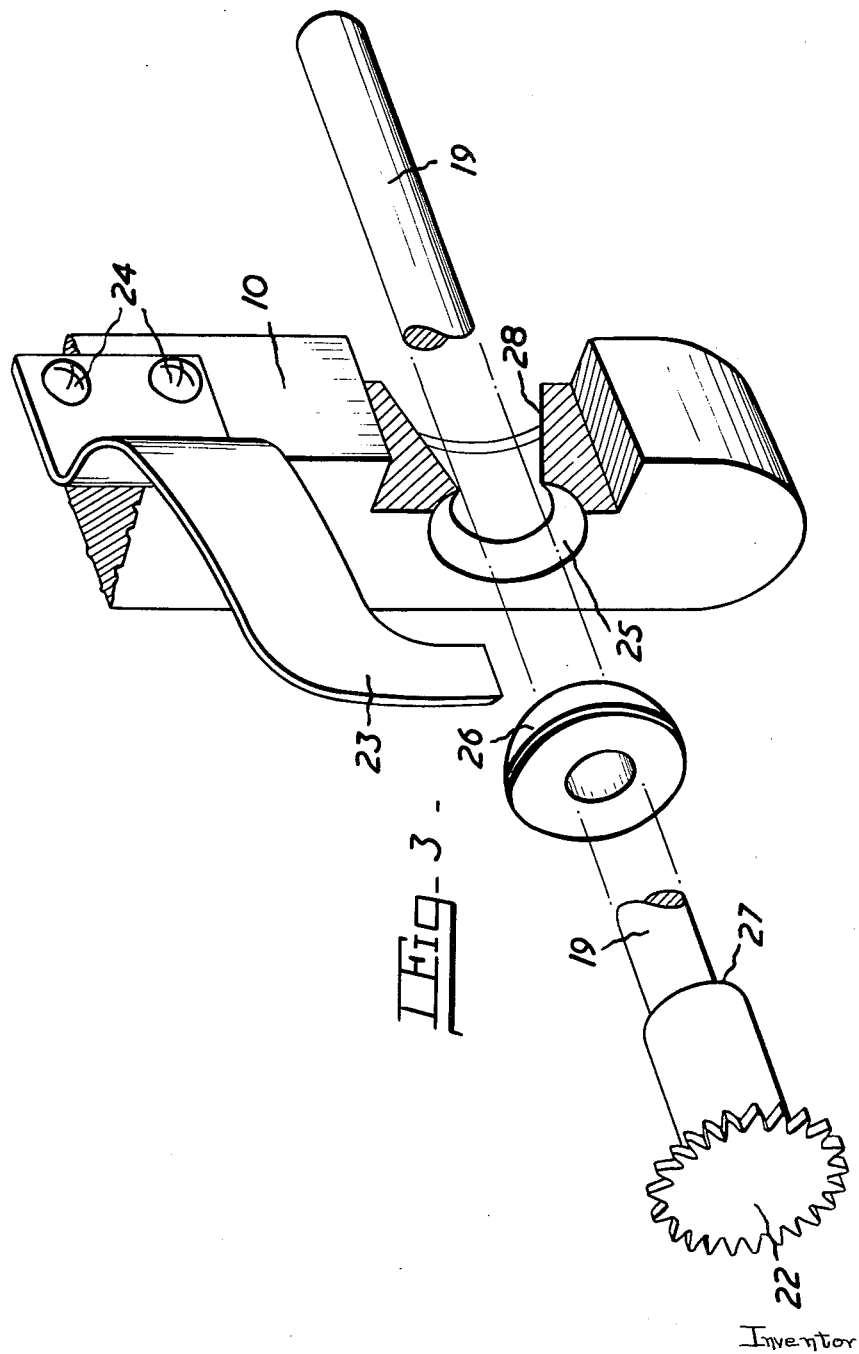

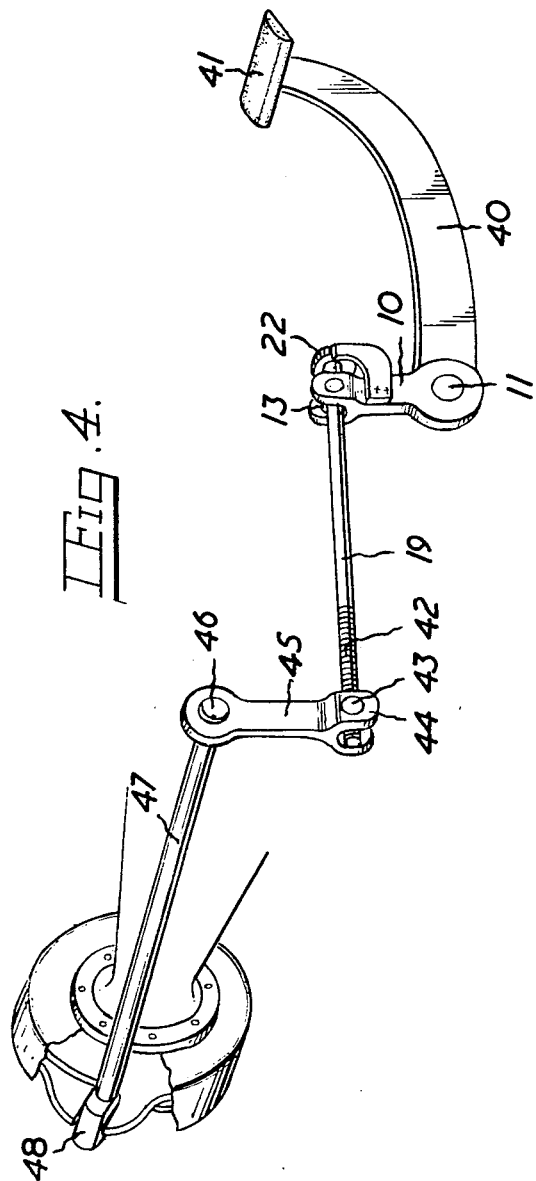

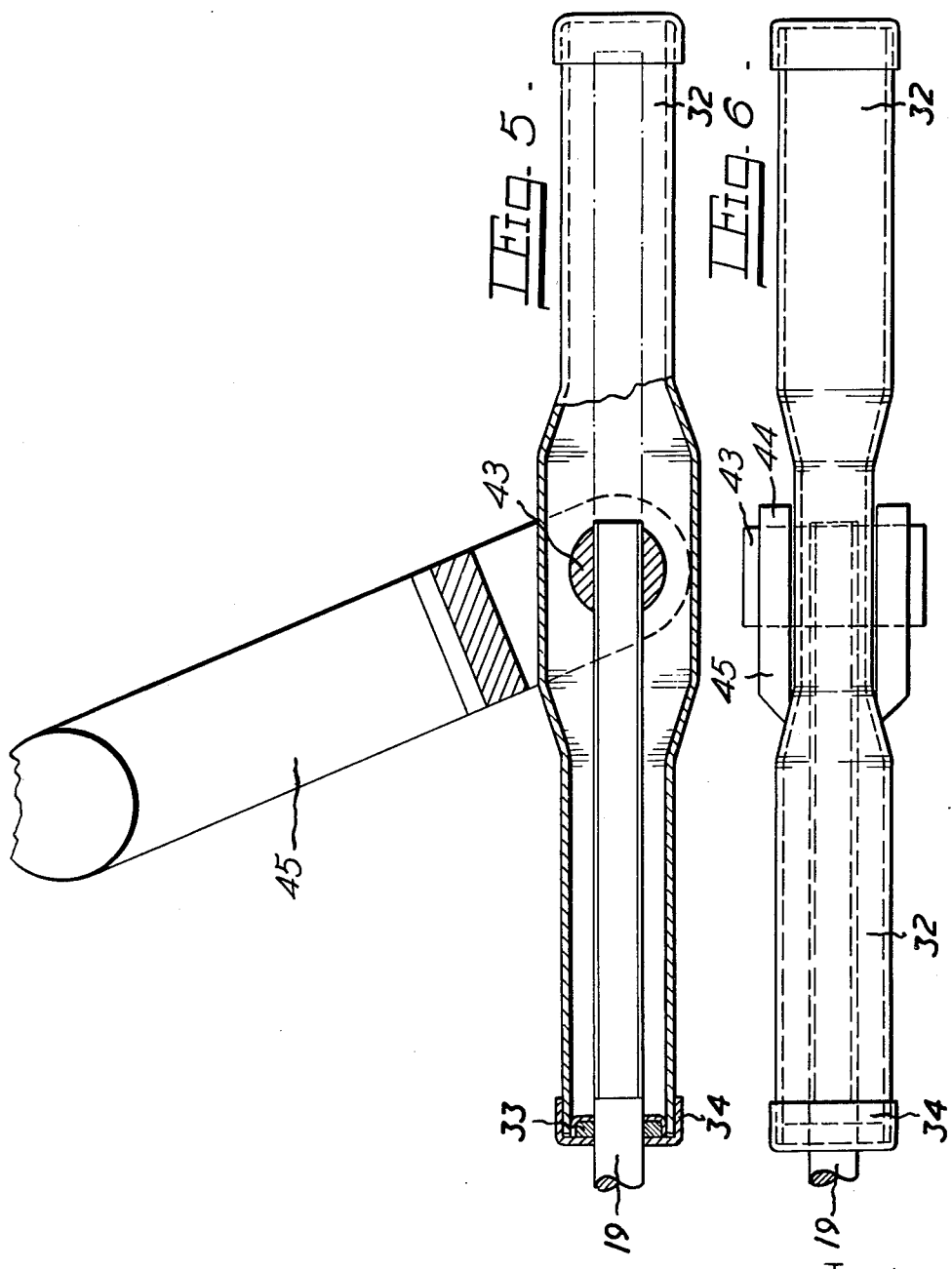

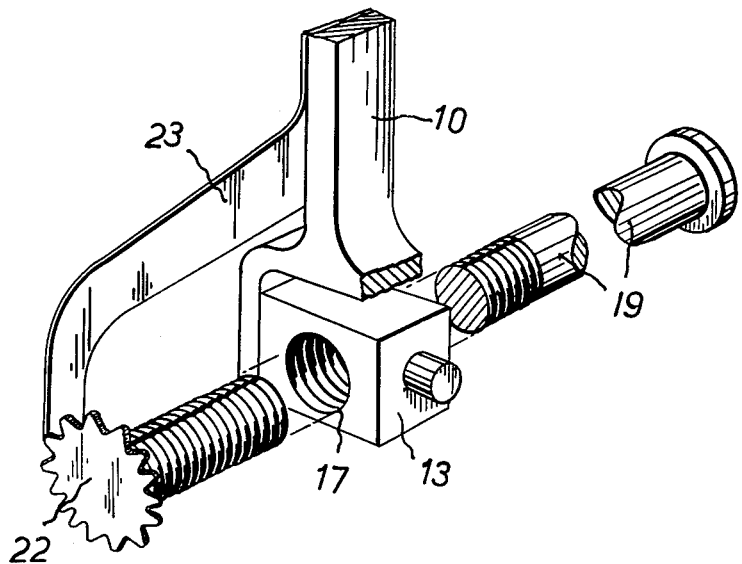

United States Patent Office 3,199,640
Patented Aug. 10, 1965

3,199,640
AUTOMATIC ADJUSTER
George Eric Thompson, Edgbaston, Birmingham, England, assignor to Girling Limited, Tyseley, England, a British company
Filed July 2, 1963, Ser. No. 292,225
Claims priority, application Great Britain, July 5, 1962, 25,774/62
6 Claims. (Cl. 188—196)

This invention relates to a new or improved adjuster for adjusting the effective length of a rod which is employed for transmitting movement and which is actuated by an angularly movable lever or the like, the adjustment being effected automatically when the angular movement of the lever relative to the rod exceeds a predetermined value.

My improved adjuster is particularly intended for adjusting the effective length of a rod forming part of a vehicle brake mechanism but can be employed for various other purposes.

In mechanism in accordance with my invention a rod of which the effective length is adjustable by rotating it is carried through and is engaged by a lever pivoting about a point spaced from the rod, and the rod carries a toothed wheel which is engaged by a pawl on a spring blade fixed to the lever.

The other end of the rod will usually be constrained to move along a predetermined path by its connection to a part to be operated, and the lever is normally substantially at right angles to the rod.

When the rod is moved axially by angular movement of the lever, the co-operation of the pawl with the toothed wheel rotates the rod to adjust its effective length when the angular movement of the lever exceeds a predetermined value.

Two forms of adjusting mechanism in accordance with my invention are illustrated by way of example in the accompanying drawings in which:

FIGURE 1 is a side elevation, partly in section, of one form of mechanism;

FIGURE 2 is a perspective view of the separated parts of the mechanism shown in FIGURE 1;

FIGURE 3 is a perspective view similar to FIGURE 2 but showing some modification;

FIGURE 4 is a perspective view of the mechanism illustrated in FIGURES 1 and 2 included in an arangement for applying a brake;

FIGURES 5 and 6 are respectively a side elevation in part section and a plan on an enlarged scale of the connection of the adjuster to the arrangement for applying a brake illustrated in FIGURE 4; and FIGURE 7 is a perspective view similar to FIGURE 2 but showing a modification.

In the mechanism shown in FIGURES 1 and 2, 10 is an actuating lever angularly movable about an axis 11. The lever may for example be one arm of a bellcrank of which the other arm carries a brake pedal.

The lever terminates at its free lower end in a fork 12 in which is mounted for angular movement about an axis parallel to that of the lever a trunnion 13.

The trunnion is located against axial movement by a head 14 on one end and by an annular washer 15 on the other end secured by a split-pin 16.

The trunnion has a transverse bore 17 of which one end is chamfered as shown at 18.

A rod 19 passing through the bore in the trunnion is formed with a chamfered step or shoulder 21 for engagement with the chamfered end 18 of the bore. On its free end the rod carries a toothed wheel 22 co-operating with the free end of a resilient tongue or pawl 23 secured to the lever by screws or rivets 24 at a point spaced upwardly from the fork.

The rod 19 is normally substantially at right angles to the lever. When the lever is moved angularly about its pivot to move the rod axially the angle between the rod and the lever changes so that there is relative movement between the toothed wheel 22 and the pawl 23. When the axial movement of the rod exceeds a predetermined value the relative movement between the toothed wheel and pawl becomes sufficient for the pawl to rotate the wheel and rod through an angle equal to the spacing between two or more adjacent teeth. This rotation may be arranged to take place either on the operational or return movement of the lever and rod.

The rod is in screw-threaded engagement with a part to be actuated so that rotation of the rod automatically adjusts its effective length.

In the modification shown in FIGURE 3, the trunnion is omitted and the rod is carried through a bore in the lever itself. One end of the bore is formed with a part-spherical recess 25 to receive a part-spherical washer 26 mounted on the rod and backed by a shoulder 27 on the rod. The remainder of the bore is coned as shown at 28 to allow for the relative angular displacement between the rod and the lever.

The operation of this mechanism is the same as that of the mechanism described above.

The other end of the rod 19 may be in screw-threaded engagement with any convenient means for actuating a vehicle brake or other mechanism.

As shown in FIGURE 4, the construction according to FIGURES 1 and 2 may be conveniently included in a brake applying arrangement in which a pedal lever 40 carrying a pad 41 is connected to the actuating lever 10 which carries the resilient tongue or pawl 23. The end 42 of the rod 19 remote from the lever 10 is in screw-threaded engagement with a trunnion 43 carried by the forked end 44 of a lever 45 which is angularly movable about an axis 46. The screw threads carried by the end of the rod 19 engaging with the trunnion 43 are of a hand opposite to the direction of rotation of the rod by the toothed wheel 22 when the rod is rotated by the pawl 23 the forked end 44 of the lever is moved towards the end of the lever 10 remote from the pivot axis 11.

The screw-threaded engagement between the rod 19 and the trunnion 43 is shown on a larger scale in FIGURES 5 and 6.

However, in the arrangement illustrated in FIGURES 5 and 6 the screw-threaded portion of the rod 19 and the part of the trunnion between the limbs of the fork 44 are enclosed within a tabular shield 32 to protect them from dirt and water, the rod being brought in through a sealing washer 33 housed in a cap 34 at one end of the shield.

An actuating rod 47 is connected at one end to the lever 45 and at the other end to the brake mechanism 48 to be actuated.

The brake mechanism 48 is conveniently actuated by depressing the pad 41 which rotates the actuating lever 10 about its axis 11 and moves the rod 19 to the right in the drawing, thereby angularly moving the lever 45 and the rod 47 to actuate the brake mechanism 48.

The co-operation of the resilient tongue or pawl 23 with the toothed wheel 22 carried at the end of the rod 19 is as described above.

In a modification of the construction shown in FIGURES 1 and 2 as illustrated in FIGURE 7, the rod 19 may be in screw-threaded engagement with the bore 17 in the trunnion 13 in which case the other end of the rod will be rotatably coupled to a part to be actuated. The rod in that case may operate either in tension or compression.

I claim:

1. Mechanism for transmitting movement incorporating a lever having a first end and a second end, and a rod, a stationary pivot about which the lever at said first end is angularly movable, a forked end at said second end of said lever, a trunnion mounted in the forked end of said lever and having an opening through which said rod is carried, a shoulder on the rod adapted to bear against one side of the trunnion, a toothed wheel carried by one end of the rod, a blade fixed at one end to the lever at a point between said stationary pivot and said trunnion, and a pawl tooth formed at the free end of said blade and adapted to engage the toothed wheel to rotate the rod when angular movement of the lever exceeds a predetermined value.

2. Mechanism for transmitting movement incorporating a lever having a first end and a second end, and a rod having a screw-threaded portion, a stationary pivot about which the lever at said first end is angularly movable, a forked end at said second end of said lever, a trunnion mounted in the forked end of said lever and having a transverse screw-threaded bore with which the screw-threaded portion of said rod is engaged, a toothed wheel carried by one end of the rod, a blade fixed at one end to the lever at a point between said stationary pivot and said trunnion, and a pawl tooth formed at the free end of the blade and adapted to engage the toothed wheel to rotate the rod when angular movement of the lever exceeds a predetermined value.

3. Mechanism for transmitting movement incorporating a lever having a first end and a second end, and a rod, a stationary pivot about which the lever at said first end is angularly movable, said lever at said second end having an opening through which the rod is carried and of such a form as to permit relative angular movement between the lever and the rod, a part circular washer carried by the rod and adapted to engage with one end of the opening, a toothed wheel carried by one end of the rod, a blade fixed at one end to the lever at a point between said stationary pivot and said second end of said lever, and a pawl tooth formed at the free end of the blade and adapted to engage the toothed wheel to rotate the rod when angular movement of the lever exceeds a predetermined value.

4. Mechanism for transmitting movement between a brake operating lever having a first end and a second end, and a brake actuating mechanism, comprising a brake pedal in rigid connection with the first end of said operating lever, a stationary pivot about which the lever at said first end is angularly movable, a forked end at said second end of said lever, a rod having a first end provided with a screw-threaded portion engaging with screw threads on a part of said brake actuating mechanism and a second end, a trunnion mounted in the forked end of said operating lever and having an opening through which said rod is carried, a shoulder on the rod adapted to bear against the side of the trunnion remote from said brake actuating mechanism, a toothed wheel carried by the second end of said rod, a blade fixed at one end to the opearting lever at a point between said stationary pivot and said trunnion, and a pawl tooth formed at the free end of said blade and adapted to engage the toothed wheel to rotate the rod and adjust the brake actuating mechanism when angular movement of the brake pedal and the operating lever exceeds a predetermined value.

5. Mechanism for transmitting movement between a brake operating lever having a first end and a second end, and a brake actuating mechanism, comprising a brake pedal in rigid connection with the first end of said operating lever, a stationary pivot about which the lever at said first end is angularly movable, a forked end at said second end of said lever, a rod having a first end connected to said brake actuating mechanism and a second end, a screw-threaded portion on the rod between the first end and the second end of the rod, a trunnion mounted in the forked end of the lever and having a transverse screw-threaded bore with which the screw-threaded portion of the rod is engaged, a toothed wheel carried by the second end of the rod, a blade fixed at one end to the operating lever at a point between said stationary pivot and said trunnion, and a pawl tooth formed at the free end of said blade and adapted to engage the toothed wheel to rotate the rod and adjust the brake actuating mechanism when angular movement of the brake pedal and the operating lever exceed a predetermined value.

6. Mechanism for transmitting movement between a brake operating lever having a first end and a second end, and a brake actuating mechanism, comprising a brake pedal in rigid connection with the first end of said operating lever, a stationary pivot about which the lever at said first end is angularly movable, a rod having a first end provided with a screw-threaded portion engaging with screw threads on a part of said brake actuating mechanism and a second end, said lever at said second end having an opening through which the rod is carried and of such a form as to permit relative angular movement between the lever and the rod, a part circular washer carried by the rod and adapted to engage the side of the lever remote from the brake actuating mechanism at a point surrounding the opening, a toothed wheel carried by the second end of the rod, a blade fixed at one end to the operating lever at a point between said stationary pivot and said second end of the lever, a pawl tooth formed at the free end of the blade and adapted to engage the toothed wheel to rotate the rod and adjust the brake actuating mechanism when angular movement of the brake pedal and the operating lever exceeds a predetermined value.

References Cited by the Examiner

UNITED STATES PATENTS

| | | | |
|---|---|---|---|
| 1,943,816 | 1/34 | Delahaye | 188—79.5 |
| 2,130,857 | 9/38 | Press | 188—79.5 |
| 2,224,197 | 12/40 | Schlueter | 188—79.5 |
| 2,289,506 | 7/42 | Kuebler. | |
| 2,940,554 | 6/60 | Cameron | 188—19 X |

MILTON BUCHLER, *Primary Examiner.*

DUANE A. REGER, ARTHUR L. LA POINT,
*Examiners.*